Oct. 10, 1939.  D. B. REPLOGLE  2,175,641

MOTOR AND FAN UNIT

Filed Feb. 17, 1936

Inventor

D. B. Replogle,

By Munson H. Lane.

Attorney

Patented Oct. 10, 1939

2,175,641

UNITED STATES PATENT OFFICE 2,175,641

MOTOR AND FAN UNIT

Daniel Benson Replogle, Berkeley, Calif., assignor to The Ohio Citizens Trust Company, Toledo, Ohio, a corporation of Ohio, as trustee Application February 17, 1936, Serial No. 64,420

4 Claims. (Cl. 230—117)

This invention relates to improvements in the mode of propelling air or the like through fluid-tight pipes or conduits. The principle of the invention may be utilized in various systems which employ a rapidly moving fluid, as for example in pneumatic cash conveying systems, wind tunnels, pneumatic cleaning systems, and the like.

According to my invention, the power plant employed for propelling the fluid is located within the pipe or conduit and it is an important object of the invention to increase the efficiency of said power plant and to reduce to a minimum vibration and noise.

In attaining these results, I preferably employ a plurality of mechanically independent motor and fan units arranged in tandem within the tube. The motors have similar speed increasing characteristics whereby they are adapted to simultaneously increase to higher speed according as the fluid flow through the system is obstructed.

The present invention is in the nature of an improvement on the power plant disclosed in my prior Patent No. 1,533,271 dated April 14, 1925 entitled Airway cleaning apparatus.

The invention will be more readily understood by reference to the accompanying drawing and the following detailed description in which a specific embodiment of the invention is set forth in detail for the purpose of illustration, it being understood that the invention is not to be limited to the details set forth.

Figure 1:
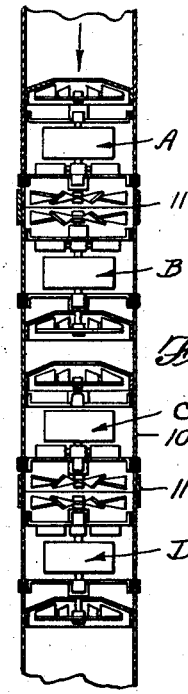
Fig. 1 is a view somewhat diagrammatic in character showing a fluid-tight pipe or conduit in section with a plurality of axially arranged motor and fan units mounted therein, the latter being shown in elevation.

Referring to the drawing and particularly to Fig. 1, the reference numeral 10 denotes a continuous fluid-tight conduit, pipe or housing for the power plant which is employed for the propulsion of air or other fluid.

To facilitate mounting and assembling of the power plant, portions of the conduit occupied by the power plant may be made in removable sections coupled in any suitable manner, conventional couplings being indicated at 11—11.

The power plant is shown as made up of a plurality of interchangeable, independent, reversible, single units A, B, C and D, axially arranged, and each consisting of a motor and fluid-tight means actuated thereby. If desired, alternate units may be reversed end for end with reference to the adjacent units. Adjacent pairs of units may be considered as constituting what may be termed "double units" represented, for example, by pairs AB and CD, which pairs may be multiplied as many times as desired, according to the requirements of the particular case.

The units are mounted in such a manner as to avoid vibration, the motor being carried by rings or spiders which are connected to the housing by vibration-deadening means.

Figure 2:
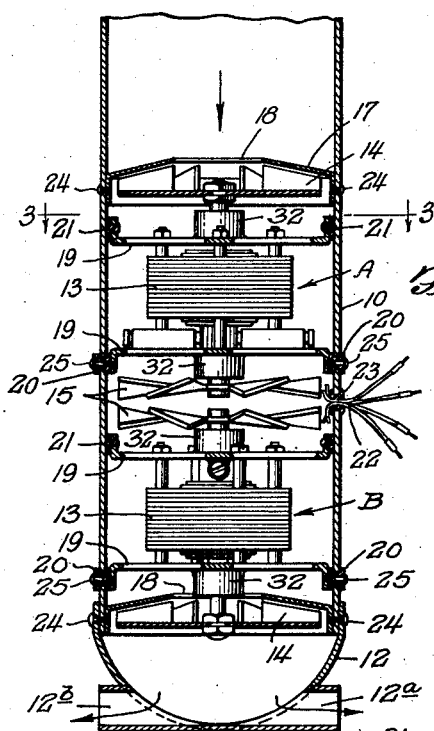
Fig. 2 is a similar view in somewhat greater detail, showing the invention as applied to the power plant of a pneumatic cleaning system.
Figure 4:
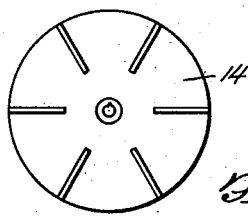
Fig. 4 is a detailed view showing one of the centrifugal fans employed in the system.
Figure 5:
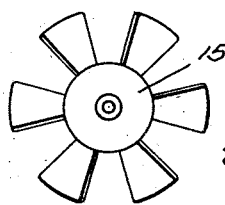
Fig. 5 is a detailed view of one of the propeller fans employed in the system.
Figure 3:
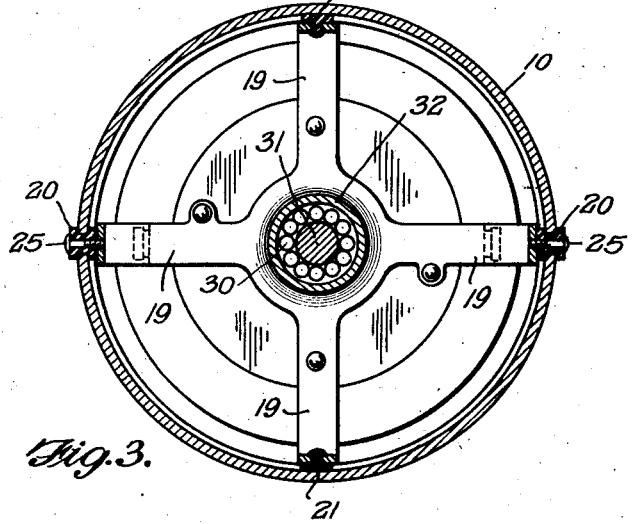
Fig. 3 is an enlarged section on line 3—3 of Fig. 2.

The details of construction and of mounting are best shown by reference to Figs. 2-5 inclusive, the general arrangement being substantially the same as in Fig. 1, except that in Fig. 2 only one double unit is illustrated and the conduit or housing is intended to represent the lower portion of the power plant of a suction cleaner.

Referring now to Fig. 2, the reference numeral 10 in this figure likewise denotes the fluid-tight conduit or housing in which the power plants are housed. This housing may be the lower end of the caddy or container disclosed in my application Serial No. 56,384, filed December 27, 1935, now Patent No. 2,146,763, dated February 14, 1939. The housing may be of metal, "Bakelite" or other suitable material. The upper end of this housing may be occupied by air filtering and dust collecting means of any suitable type.

At the bottom of the conduit is a removable cap 12 having lateral offtakes 12a and 12b, each preferably large enough to take the entire fluid output from the propelling means, it being understood that either offtake may be capped so that all the air passes through one or the other outlet.

Referring first to the single elements which make up the units A and B, the actuating elements are designated by numerals 13, 13, which represent motors of any suitable type, which motors may be unhoused except for the casing 10 so that the field and armature of each motor will be cooled by the fluid passing thereover. The motors are similar in construction and are shown arranged to rotate in opposite directions about their common axis, but it will be noted that by reversal of the motors end for end, they may be caused to rotate in the same direction.

As shown, each motor drives a centrifugal fan 14 and a propeller type fan 15. The arrangement is such that the centrifugal fans 14, 14 are at opposite ends of the double unit, while the propeller fans 15, 15, are located adjacent each other but their blades are oppositely inclined and rotate in opposite directions.

In the unit A, the centrifugal fan first receives the air or other fluid, while in the unit B, the centrifugal fan discharges the air through the outlets.

Each centrifugal fan is shown as provided with a cone-shaped ring or cover 17 having an inlet opening 18.

Each of the motors is carried by a pair of spiders or rings 19, 19, antifriction means 30 being provided between the shaft 31 and the housing 32. Each spider is provided with cushioning members, preferably of soft ruber, 20 which may be compressed and inserated through openings in the housing. In this manner, a fluid-tight connection is insured and noise and vibration are entirely eliminated. The cushioning members 20, 20, may be supplemented by cushions 21, 21, on the intermediate legs of the spider, which cushions merely abut against the inner wall of the housing.

Where electric motors are employed, conductor cords 22 are adapted to supply current to the motors and these cords are admitted through an eyelet 23, preferably of rubber, which may be compressed and inserted through a small opening in the housing, thus providing a fluid-tight connection. The outlet is preferably of nonconducting material.

In assembling the parts, the bottom or cap would, of course, be assumed to have been removed. The upper conical ring or cover 17 is inserted first and secured in place by suitable fastening means 24. The upper power unit A is then inserted including the motor and fans together with the spiders which support the motor. The spiders are secured in place by suitable fastening means 25 passing through the flexible cushions 20, which cushions, as above explained, are forced through openings in the casing.

The second unit B with the centrifugal fan 14 removed, is then inserted and the spiders secured in place in the same manner as the first unit. Afterward the lower conical ring 17 is inserted and then the centrifugal fan 14 is secured to a motor shaft. Lastly, the cap 12 is positioned and fastening means 24 are employed for holding both the ring and the cap in position.

A similar mode of assembling the elements may be employed in the arrangement shown in Fig. 1, wherein the conduit is made sectional to facilitate assembly, as previously explained.

In operation, air or other fluid is drawn through the reduced opening 18 in the conical ring 17, motion being imparted thereto by the centrifugal fan 14 which passes the air over the part of the motor cooling the field, armature and bearings. The air is then taken up by the propeller blades of the first unit and delivered thence to the oppositely inclined and oppositely rotating blades of the adjacent propeller fan. The air then passes over the second motor, cooling the same and is thence delivered to the opening 18 in the second conical ring 17 and is taken up by the second centrifugal fan 14 and discharged through one or the other or both of the outlet openings 12a or 12b. This arrangement of centrifugal and propeller fans does away with the necessity for stationary or stator blades commonly employed in motor and fan assemblies.

It will be obvious that a partial vacuum may be created in rear of the power plant which may be utilized for any desired purpose and air under pressure greater than atmospheric may be delivered from the other end of the power plant.

An important advantage accruing from the arrangement of the successive propulsion units in axial alignment within a fluid-tight conduit resides in the fact that the motors are enveloped in a straight and continuous fluid stream which is not obstructed by turns. This arrangement tends to augment the speed of the air and increases its efficiency in the cooling of the motor units, it being important in motors of this kind that a cooling air stream be passed through the field and armatures of the motor so as to accelerate the conduction of heat away from the motor.

The axial alignment of the propulsion unit also makes it expedient to use a much smaller and lighter motor than would be otherwise suitable, because of the greater efficiency of this arrangement, and lightness is a very great consideration in connection with many types of apparatus, particularly in the case of portable cleaners.

The axial alignment taken in connection with the characteristic of speed increasing in reverse proportion to the load allows both motors to speed up without resistance, and necessarily increases the speed of the air current and thereby increases the cooling effect because the successive motors are enveloped jointly within the fluid of the air stream.

The invention is particularly useful in the suction cleaner art, since in this art the motor increases its speed in proportion as the load decreases and the greatest load on the power plant is when no sweeping operation whatever is being performed; that is, when the cleaner nozzle is removed from the floor and there is a free flow of air, the motor is most heavily overloaded. However when the air is partly shut off then there is the apparent effort of the motors to pull as much air through a small orifice as there was previously in getting through the unobstructed passage and it is this feature that makes for efficiency in sweeping.

In prior devices in this art, where a plurality of motors have been employed, motors have generally not been located within the air stream, and where a motor has been employed within an air stream, a single motor only has been employed.

It will be apparent that two or a plurality of motors, being small, can be kept cool much more readily than a single motor having the aggregate power of a plurality of motors. Furthermore, the rate of revolutionary speed is much less destructive in the case of a small motor than in a large one. Moreover, a single large motor will obstruct more of a cylindrical passageway in proportion to its power than will two or more small motors in tandem.

The mounting of the successive motors in axial alignment has also been found to decrease the humming sound in addition to increasing the efficiency of the motors, and this is particularly true where the motors of successive units are arranged to revolve in opposite directions about their common axis.

The invention has been described in detail for the purpose of illustration but it will be understood that various modifications may be resorted to without departing from the spirit of the invention, as for example, the blades on the propellers may be varied in number and shape; the edges of these blades may be made parallel, and operating edges may be brought into very close proximity, so as to sharply reverse the spirality of the air stream and augment its forward flow.

I claim:

1. In a device of the character described, an air conduit having mounted therein a plurality of independent axially aligned variable speed electric motors, each connected for driving one or more fans, said motors having similar speed increasing characteristics, whereby they are adapted to automatically increase to higher speed in degree as the air-flow through the system is obstructed.

2. In a device of the character described, an air conduit having a double power unit located therein, comprising a pair of oppositely rotating independent motors, each motor operating a propeller and a centrifugal fan located at opposite ends of the motor shaft, the two propeller fans being located adjacent each other and having oppositely inclined blades.

3. In a device of the character described, a conduit having a power plant comprising a plurality of double power units located therein and axially arranged, said double units each comprising a pair of motors operating in opposite directions about their common axis, each motor carrying a propeller and a centrifugal fan at opposite ends of its shaft, the propeller fans of each double unit being arranged adjacent each other.

4. In a suction cleaning system of the character described, a cylindrical tank housing a power plant comprising a plurality of suction producing units, each unit including an electric motor and a fan operated thereby, said units being arranged serially and in axial alignment within said tank, the successive motors being arranged to operate in opposite directions about their common axis.

DANIEL BENSON REPLOGLE.